UNITED STATES PATENT OFFICE

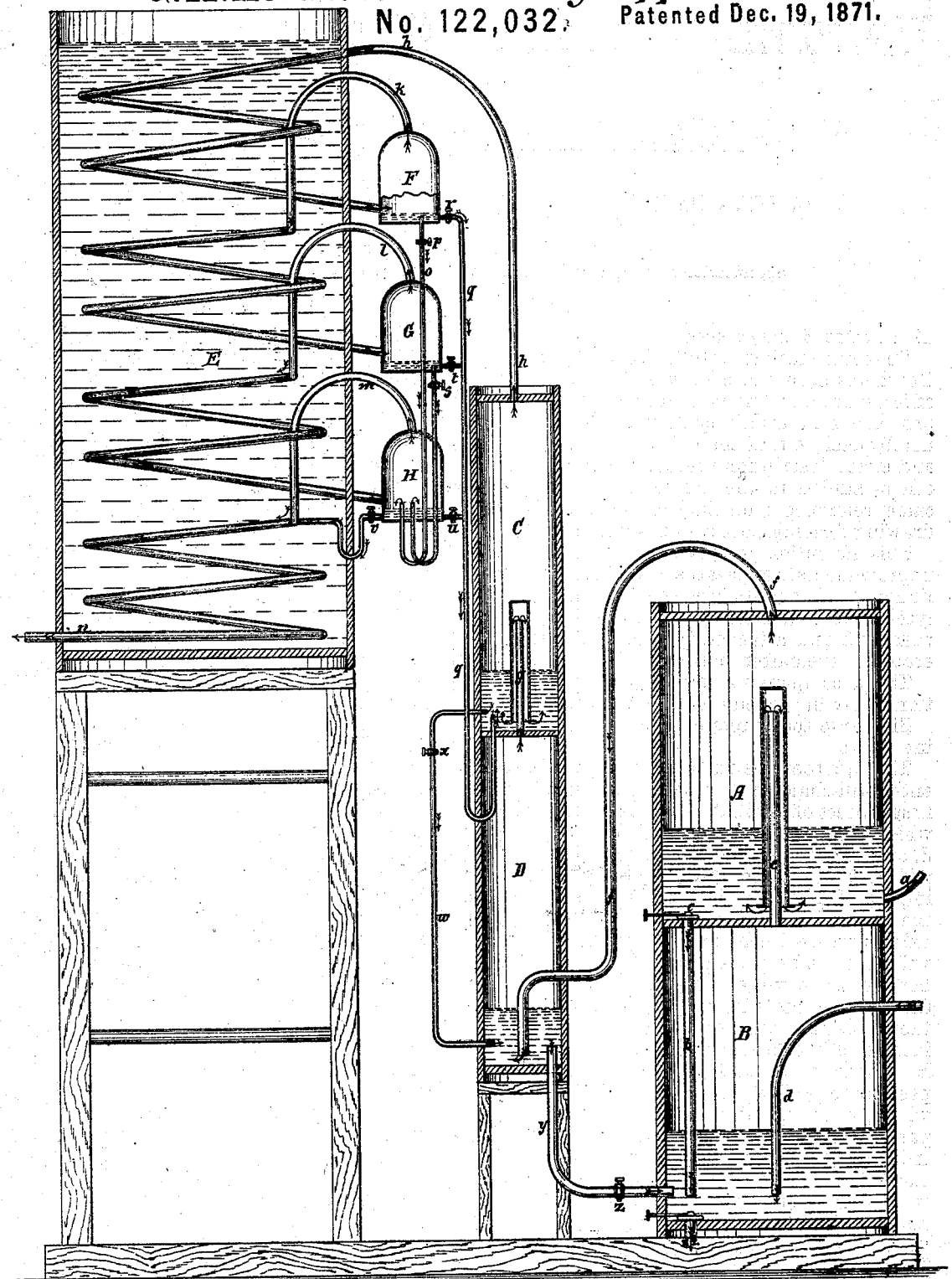

GOTT-HARD KLEINER, OF GEORGETOWN, MISSOURI.

IMPROVEMENT IN APPARATUS FOR DISTILLING SPIRITS.

Specification forming part of Letters Patent No. 122,032, dated December 19, 1871.

*To all whom it may concern:*

Be it known that I, GOTT-HARD KLEINER, of Georgetown, in the county of Pettis and State of Missouri, have invented a new and useful Improvement in Distilling Apparatus; and I do hereby declare that the following is a full, clear, and exact description thereof, which will enable others skilled in the art to make and use the same, reference being had to the accompanying drawing forming part of this specification.

This invention relates to new and important improvements in apparatus for distilling alcoholic liquors; and consists in a series of chambers, analyzers, and condensers, with the parts connected therewith and attached thereto arranged to operate as hereinafter more fully described.

The accompanying drawing is a vertical section of my improved distilling apparatus.

Similar letters of reference indicate corresponding parts.

Through the pipe *a* the first charge of beer will enter still-chamber A, where it will undergo the first process of distillation by means of the steam which enters still-chamber B through steam-pipe *d*, and thence through pipe *e* (which is covered with a cape or hood) into the charge. After being distilled a short time it will be let down into the still-chamber B through pipe *b* by opening valve *c*, where a constant stream through pipe *d* will heat the beer. After boiling in this chamber the steam will escape through pipe *e* and under its cape into a new charge of beer, which in the mean time has been placed in chamber A, instead of the charge which is now in chamber B. After boiling in A the steam will enter and pass through pipe *f* into chamber D of doubler, which, for convenience, we will suppose is already partly filled with nearly-exhausted low wines, as indicated by the drawing. Here another distillation will take place, and the more alcoholic vapor will enter chamber C through pipe *g* (which is also covered by a cape) and boil the low wines, which we will suppose occupy said chamber C. In this chamber the alcohol is gathered in the form of hot vapor, which will pass over into the condenser E through pipe W W. A portion of the vapor will be condensed in passing through the coils of the worm surrounded by water, and on entering the first analyzer F the condensed vapor will be collected while the steam rises and passes over into condenser again through pipe K and will be led into second analyzer G, where the same separation between the condensed and uncondensed vapors will take place. The uncondensed vapor will then find its way through pipe *l*, not being led through condenser, and will be discharged into third analyzer H, where it undergoes the same process as in analyzers F and G, and will at last pass through pipe *m* into condenser, and the pure spirits will be discharged at end of worm *n*. The fluid which is collected in analyzer F may either be let into analyzer H through pipe *o* by turning stop *p* or let into doubler-chamber C through pipe *q* by turning stop *r*, as the distiller may see fit. In the last event it will be distilled again at once. In like manner may the liquid be treated in analyzer G by turning or shutting stops *s* and *t*. Now I come to the last analyzer H, into which the condensed vapor in F and G may have been drawn. Now, if I wish to have a high spirit I will open stop *u*; if I do not care to have particularly high spirits I will open stop *v*, which will let the fluid through the meter as taxable spirits. Pipe *w* will let the low wines from chamber C into chamber D by turning stop *x*, and pipe *y* will let the much-exhausted low wine into still-chamber B by turning *z*, where the very last of the spirit will be taken away; and through pipe and valve *z z* the entirely-exhausted beer and low wines will be discharged.

These are improvements which I have carefully studied and experimented upon as a practical distiller.

I particularly claim as my invention the attaching of analyzers F, G, and H with their attendant piping and stops, and also the additional doubler-chamber C, which will receive and distil all the condensed vapors led into it from the analyzers without stopping the apparatus or retarding any of the other operations.

The following are the advantages of my invention: First, I can make stronger by first distillation than by the ordinary apparatus. Second, I therefore save much cooperage, which is expensive. Third, I further save a large amount of warehousing, which is a heavy item. Fourth, I further save, daily, gaugers' fees and warehouse stamps. Fifth, I am not troubled with low wines, which would require tubs, pumps, &c. Sixth, I can distil twice as much beer in the same time as by the ordinary method. Seventh, there will only one meter be needed, which also is a great saving. Eighth, I save money in handling a less number of barrels than would be required for a lower proof spirit. Ninth, I thus save freight in shipping. Tenth, it will be a benefit to the government, as more spirits can be manufactured. Eleventh, I can sell my spirits at the same price as other distillers can and make greater profits. Twelfth, it is much easier and pleasanter for the distillers to work this improved apparatus than the old.

Having thus described my invention, I claim as new and desire to secure by Letters Patent—

The chambers A B C D, condenser E, and analyzers F G H, combined, arranged, and provided with the pipes, stops, and valves described, for the purpose of distilling and separating the product while in the worm, as set forth.

GOTT-HARD KLEINER.

Witnesses:
  MORRIS TRUMBULL,
  J. H. RICE.

(47)